United States Patent Office 2,766,282
Patented Oct. 9, 1956

2,766,282

PREPARATION OF GUANIDINO SUBSTITUTED FATTY ACIDS

Roger G. Garst, Chicago, and Bruno Vassel, Deerfield, Ill., assignors to International Minerals & Chemical Corporation, a corporation of New York No Drawing. Application April 7, 1952,
Serial No. 281,054

8 Claims. (Cl. 260—534)

This invention relates to the preparation of guanidino substituted fatty acids. More particularly, it relates to a method for the manufacture of alpha guanidino substituted fatty acids, such as glycocyamine, from guanidine salts.

A number of processes are known whereby alpha guanidino substituted fatty acids, such as glycocyamine, are prepared. Glycocyamine has been prepared from guanidine hydrochloride and chloroacetic acid by several methods. In one method, the reaction is carried out in the presence of alkali and an anhydrous organic solvent. A serious limitation of this process is the necessity for using an anhydrous solvent, and the inherent disadvantages arising from solvent dehydration and such use in any process. In another process, for the preparation of glycocyamine, a fourfold excess of pure concentrated free guanidine was employed in order to obtain a 60% yield based upon the less expensive chloroacetic acid, or a 12% yield based on the more expensive guanidine hydrochloride. It would be desirable if a commerically feasible process for the production of acceptable yields of glycocyamine in an aqueous medium, rather than anhydrous solvent medium, and fram raw materials which are not necessarily concentrated or of high purity could be discovered.

It is an object of the instant invention to provide a process for the production of alpha guanidino fatty acids, such as glycocyamine, which overcomes certain limitations and disadvantages of processes heretofore employed.

It is a further object of the instant invention to provide a commercially feasible process for the production of alpha guanidino substituted fatty acids, such as glycocyamine, in an aqueous medium while maintaining acceptable yields.

It is a further object of the instant invention to provide a process for the manufacture of alpha guanidino fatty acids in acceptable yields from an acid addition salt of guanidine and from an alpha halo fatty acid and carried out in an aqueous medium.

It is a further object of the instant invention to provide a commercially feasible process whereby acceptable yields of glycocyamine are obtained by the reaction of a crude guanidine acid addition salt and chloroacetic acid in an aqueous medium.

It is a further object of the instant invention to provide a commercially feasible process whereby acceptable yields of glycocyamine are obtained by the reaction of a crude guanidine hydrochloride mixture and chloroacetic acid in an aqueous medium.

These and other objects of the instant invention will become more apparent upon a fuller understanding of the invention as hereafter described.

The process of the instant invention comprises reacting a guanidine acid addition salt in a minimum quantity of aqueous medium with an alpha halo fatty acid, in the presence of a controlled amount of hydroxyl ions, and recovering alpha guanidino substituted fatty acid from the reaction mixture.

The instant invention is characterized by carrying out the reaction of an alpha halo fatty acid and a guanidine acid addition salt in the presence of an alkali metal hydroxide, in an aqueous medium of not more than about 15 moles of water per mole of guanidine employed.

In one embodiment of the instant invention about 2 moles of sodium hydroxide, between about 2 and about 8 moles of water, and about one mole of a guanidine salt of a monobasic acid, such as guanidine hydrochloride, or about 0.5 mole of a guanidine salt of a dibasic acid, are admixed while the temperature is maintained at between about the freezing point of the mixture and about 50 C., preferably between about 15° C. and about 25° C. To the mixture is added with agitation, while maintaining the temperature below about 50° C., preferably between about 15° C. and about 25° C., about one mole of chloroacetic acid. The temperature is maintained between about 0° C. and about 60° C., preferably between about 25° C. and about 40° C. If the mixture becomes overheated, a small amount of water may be added, however, increasing the amount of added water adversely effects the yield of glycocyamine product and in carrying out the reaction it is preferred to add not more than a total of about 4 moles of water. The reaction is more rapid at temperatures between about 40° C. and about 60° C., however, at lower temperatures in the range, the reaction is easier to control and it is preferable to employ lower temperatures and to extend the period of the reaction, for example, to at least about twenty hours to allow it to proceed to substantial completion. When the temperature is maintained at between about 25° C. and about 40° C., the preferred reaction period is between about twenty and about thirty hours. Glycocyamine is recovered from the reaction products.

In another embodiment of the instant invention, the process involves admixing about one mole of a guanidine salt of a monobasic acid, such as guanidine hydrochloride and about one mole of sodium hydroxide in not more than about 10 moles of water, and then adding to the resulting mixture, a little at a time, over a period of about four hours, a total of about one mole of chloroacetic acid and about one mole of sodium hydroxide. The addition of sodium hydroxide and chloroacetic acid spaced over a period of between about two and about twenty-four hours, preferably about four hours, and the mixture should be agitated during this period. The temperature of the mixture during the addition of the sodium hydroxide and chloroacetic acid should be maintained between about 0° C. and about 60° C., preferably between about 25° C. and about 40° C. After the addition of the sodium hydroxide and chloroacetic acid has been completed, the resulting mixture is allowed to stand until the reaction is substantially complete, that is, between about eight and about thirty hours, preferably about twenty hours. Glycocyamine is recovered from the resulting mixture.

In practicing the instant novel process an alkali metal hydroxide, such as sodium hydroxide or potassium hydroxide, is added as a powder, in pellet form, or as a solution. When added as a solution of sodium hydroxide, the amount of water added initially is decreased so that the total amount of water present is not more than about 15 moles of water per mole of guanidine salt. The guanidine salt may be guanidine hydrochloride, guanidine sulfate, guanidine nitrate or the like.

The resulting mixture of guanidine salt and alkali metal hydroxide is agitated for between about ten minutes and about sixty minutes, preferably for about fifteen minutes at a temperature of between about freezing point of the mixture and about 50° C., preferably at between about 5° C. and about 30° C. A total of about one mole of an alpha halo fatty acid, for example, chloroacetic acid and about one mole of sodium hydroxide are added to the resulting mixture, a little at a time, over a period of about four hours. The temperature of the reaction during this period of addition of the alkali metal hydroxide and the chloroacetic acid is maintained preferably at between about 30° C. and about 40° C. The use of an efficient type of agitation during this period is important and improper mixing will adversely affect the yield of glycocyamine. A minimum amount of water is added during this period. In practice the amount of water which it is necessary to add depends upon the efficiency of agitation and cooling. The lower the temperature of the reaction mixture, the easier the reaction can be controlled. Also agitation is easier at lower temperatures. If the reaction mixture is not cooled, the concentrated reaction mixture becomes hot, and in such case, water and chloroacetic acid boil out and explosive gas formation occurs. Water quenches the mixture.

When the lower temperatures in the range of between about 0° C. and about 60° C. are maintained during this step, the reaction proceeds at a slower rate, therefore, yields are maintained by lengthening the reaction period, for example, when a temperature between about 30° C. and about 40° C. is employed, the reaction period is between about twenty and about thirty hours. For an about 10° C. increase in the temperature at which the reacting mixture is maintained, the time for the reaction to proceed to completion is decreased by about half, and the reactants which are added stepwise may be added over a period of about half the time employed for the lower temperature.

It has also been discovered that yields of glycocyamine are increased if the conditions for the reaction are controlled to prevent the decomposition of chloroacetic acid. It has been discovered that chloroacetic acid is the unstable reactant instead of guanidine and that chloroacetic acid decomposition is decreased if protected from the presence of excesses of alkali and water.

In another embodiment, to about one mole of guanidine hydrochloride is added over a period of between about two and about twenty-four hours, preferably about four hours, 2 moles of sodium hydroxide and about one mole of chloroacetic acid. Not more than about 15 moles of water is employed in carrying out the reaction. The reaction is allowed to proceed to substantial completion while maintaining the temperature between about 0° C. and about 60° C., preferably between about 30° C. and about 40° C.

In another embodiment instead of adding 2 moles of sodium hydroxide to the reacting mixture containing about one mole of guanidine hydrochloride and about one mole chloroacetic acid, about one mole of sodium hydroxide is admixed initially and the second mole of sodium hydroxide is added slowly over a period of between about two and about twenty-four hours, preferably about eight hours while maintaining the temperature at between about 0° C. and about 60° C., preferably between about 30° C. and about 40° C. while the reaction is allowed to proceed to substantial completion. Not more than about 15 moles of water are employed in carrying out the reaction.

If desired the crude guanidine hydrochloride may be prepared from ammonium chloride and dicyandiamide by heating at a temperature of between about 185° C. and about 200° C. and then employed as a reactant. However, the guanidine hydrochloride produced in this way contains other compounds, such as ammonium chloride, for which allowance should be made in the amount of sodium hydroxide added. An additional amount of sodium hydroxide is added when ammonium chloride is present, that is, about one mole of sodium hydroxide per mole of ammonium chloride present.

The instant novel process is carried out by preparing a mixture containing a guanidine salt in water. The guanidine salt is preferably guanidine hydrochloride, however, the nitrate, the sulfate or the guanidine carbonate which has been treated with sulfuric acid or with hydrochloric acid, may be employed. All of the alpha halo fatty acids may be used in practicing the invention, for example, chloroacetic acid, alpha-chloropropionic acid, alpha-bromoacetic acid, and the like may be employed.

By this method glycocyamine, alpha-guanidino propionic acid, alpha-guanidino-n-butyric acid, and the like may be prepared. Such compounds have utility as pharmaceuticals, alone or in combination with other compounds.

In practicing a preferred embodiment of the instant invention about one mole of a guanidine salt of a monobasic acid, or about 0.5 mole of guanidine salt of a dibasic acid, and between about 0 and about one mole of the alkali metal hydroxide, are admixed. About one mole of an alpha halo fatty acid and between about two moles and about one mole respectively of alkali metal hydroxide and a total of about 3 moles of water are added over a period of about four hours. The temperature during the addition is controlled so that it does not rise above about 40° C. The reaction is then allowed to proceed for at least about twenty hours after the completion of the addition of the acid and alkali metal hydroxide. Glycocyamine is separated from the resulting mixture by any convenient method, such as by filtration, and is washed with water, and dried. The yield recovered is about 61% glycocyamine.

As specific examples of the process, the following serve merely as illustration, and it is not intended that the scope of the invention be limited thereto.

*Example I*

About 100 grams of 95% guanidine hydrochloride (one mole) was slurried with about 42 grams of 95% sodium hydroxide pellets (one mole) and about 2 milliliters of water. This mixture was maintained at about 25° C. After about fifteen minutes of continued stirring, the addition of a solution of about 50% aqueous sodium hydroxide and solid chloroacetic acid was begun at such a rate that about 52.5 milliliters of sodium hydroxide (one mole) and about 94.5 grams of chloroacetic acid (one mole) was added during a four hour period, while the temperature was maintained at between about 35° C. and about 40° C. When the reaction mixture became very thick, about 8 milliliters of water was added in order to aid agitation. When the addition of the sodium hydroxide and chloroacetic acid was completed, the reaction mixture was allowed to stand at about 35° C. for about twenty-four hours. Glycocyamine was recovered from the resulting mixture by diluting with about 600 milliliters of water, agitating the diluted mixture at between about 70° C. and about 80° C. for about one hour and cooling to room temperature. The glycocyamine was separated by filtration, and the crystals were washed with water and dried. The yield was about 61% or 71.6 grams.

*Example II*

The procedure of Example I was carried out in the same manner with the exception that crude guanidine hydrochloride was prepared from about 47.2 grams of dicyandiamide and 62.2 grams of ammonium chloride by heating the mixture at a temperature of about 190° C. for about thirty minutes, and the resulting mixture was cooled and then slurried with about 46.3 grams of 95% sodium hydroxide pellets (1.1 moles). The reaction was then carried out according to the procedure described above. The yield of glycocyamine was about 57% or 66.8 grams.

Having thus fully described and illustrated the char- acter of the instant invention what is desired and protected by Letters Patent is:

1. A process for the preparation of guanidino substituted fatty acids which comprises admixing a guanidine acid addition salt, alkali metal hydroxide, and an alpha halo fatty acid selected from the group consisting of alpha-chloro- and alpha-bromo fatty acids in an aqueous medium of not more than about 15 moles of water per mole of guanidine salt, allowing the reaction to proceed to substantial completion, and separating guanidino substituted fatty acid from the reaction products.

2. A process for the preparation of glycocyamine which comprises admixing a guanidine acid addition salt, alkali metal hydroxide and chloroacetic acid in an aqueous medium of not more than about 15 moles of water per mole of guanidine salt, maintaining the mixture at a temperature between about 0° C. and about 60° C., allowing the reaction to proceed to substantial completion, and recovering glycocyamine from the reaction products.

3. A process for the preparation of glycocyamine which comprises admixing guanidine hydrochloride, alkali metal hydroxide, and chloroacetic acid in an aqueous medium of not more than about 15 moles of water per mole of guanidine salt, agitating and maintaining the reacting mixture at a temperature between about 30° C. and about 40° C., allowing the reaction to proceed to substantial completion, and recovering glycocyamine from the reaction products.

4. A process for the preparation of glycocyamine which comprises admixing about one mole of a guanidine acid addition salt and a solution containing about 2 moles of an alkali metal hydroxide, adding about one mole of chloroacetic acid to the resulting mixture a little at a time, with cooling to less than about 25° C., the reaction being carried out in an aqueous medium of not more than about 6 moles of water per mole of guanidine salt, maintaining the reacting mixture at a temperature of between about 0° C. and about 60° C., allowing the reaction to proceed to substantial completion, and recovering glycocyamine from the reaction products.

5. A process for the preparation of guanidino substituted fatty acids which comprises preparing a mixture containing about one mole of a guanidine acid addition salt and about one mole of an alkali metal hydroxide, agitating the resulting mixture at a temperature between about 0° C. and about 40° C., admixing with the resulting mixture in small amounts over a period of between about two and about twenty-four hours, about one mole or alkali metal hydroxide and about one mole of an alpha halo fatty acid selected from the group consisting of alpha-chloro- and alpha-bromo fatty acids, the reaction being carried out in an aqueous medium for which not more than about 15 moles of water are added, maintaining the temperature of the reaction mixture during said addition at between about 10° C. and about 60° C., allowing the reaction to proceed to substantial completion, and recovering guanidino substituted fatty acids from the reaction products.

6. A process for the preparation of glycocyamine which comprises preparing a mixture containing about 0.5 mole of guanidine addition salt of a dibasic acid and about one mole of sodium hydroxide, adding to the resulting mixture, in small amounts over a period of about four hours, about one mole of sodium hydroxide and about one mole of chloroacetic acid, the reaction being carried out in an aqueous medium for which not more than about 15 moles of water are added, maintaining the temperature of the reacting mixture during said addition at a temperature between about 30° C. and about 40° C., allowing the resulting mixture to stand for about twenty hours, and recovering glycocyamine from the resulting mixture.

7. A process for the preparation of glycocyamine which comprises admixing about one mole of guanidine hydrochloride and about one mole of sodium hydroxide, admixing with the resulting mixture stepwise and a little at a time, during a period of between about four and about six hours a total of about one mole of sodium hydroxide and about one mole of chloroacetic acid, said reaction being carried out in an aqueous medium for which not more than about 15 moles water are added, maintaining the temperature of the mixture during the stepwise addition between about 30° C. and about 40° C., allowing the resulting mixture to stand for at least about twenty hours, and recovering glycocyamine therefrom.

8. A process for the preparation of glycocyamine which comprises heating a mixture of about 0.5 mole of dicyandiamide and about one mole of ammonium chloride at a temperature between about 180° C. and about 200° C. for between about thirty and about sixty minutes, cooling the resulting mixture and adding to the cooled mixture about one mole of sodium hydroxide, admixing with the resulting mixture about one mole of sodium hydroxide and about one mole of chloroacetic acid, said alkali and acid being added a little at a time over a period of about four hours, carrying out the reaction in such water that the total amount added is not more than about 15 moles and maintaining the temperature during said addition at between about 0° C. and about 60° C., allowing the resulting mixture to stand for at least about sixteen hours, and separating glycocyamine from the resulting mixture.

References Cited in the file of this patent

UNITED STATES PATENTS

| 2,249,135 | Hechenbleikner et al. | July 15, 1941 |
| 2,516,611 | Berhenke et al. | July 25, 1950 |

OTHER REFERENCES

Ramsay: Ber. Deut. Chem., vol. 41, pp. 4385–92 (1908).

Berhenke et al.: Ind. and Eng. Chem., vol. 38, pp. 544–6 (1946).